Patented Aug. 10, 1926.

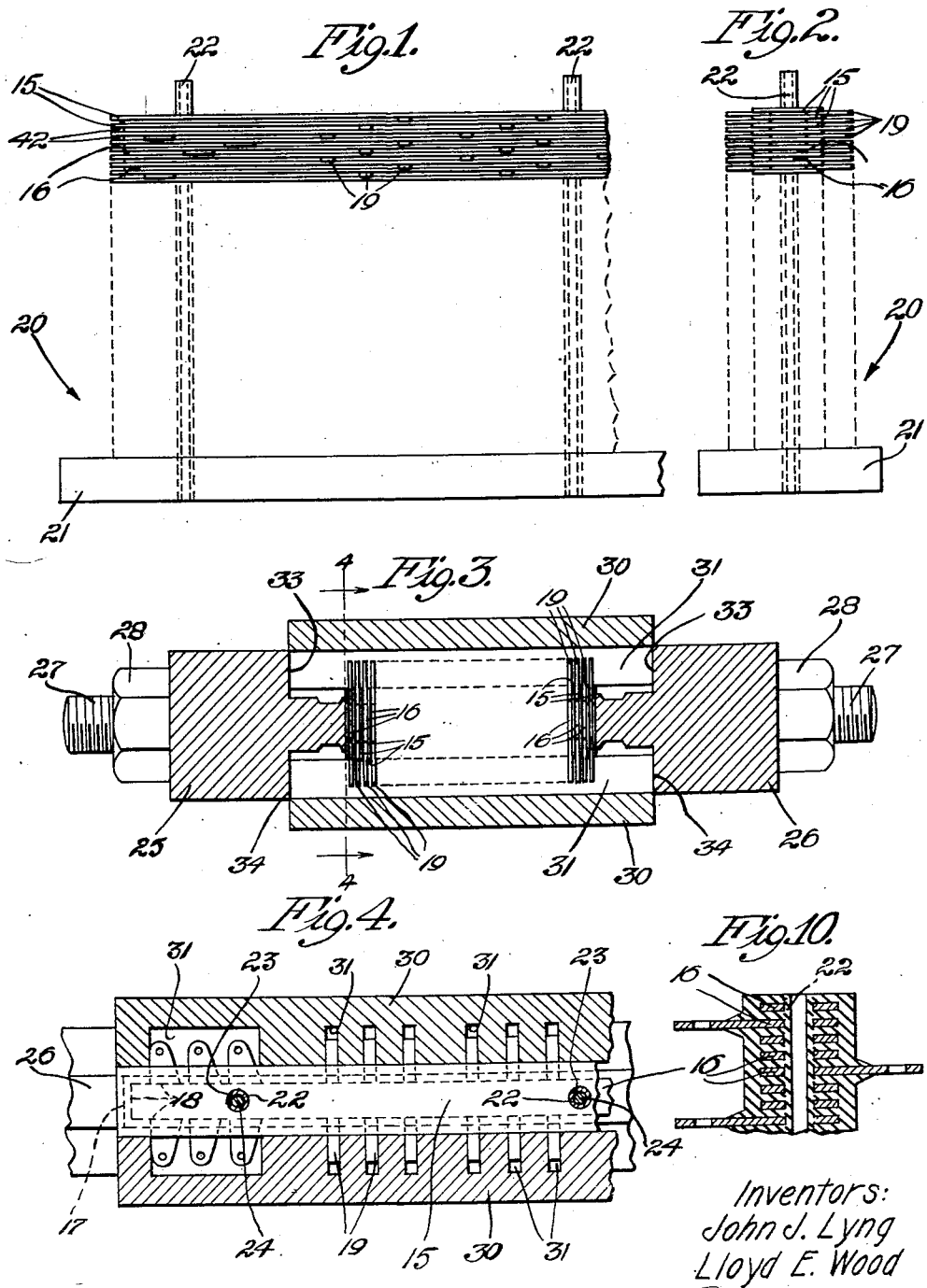

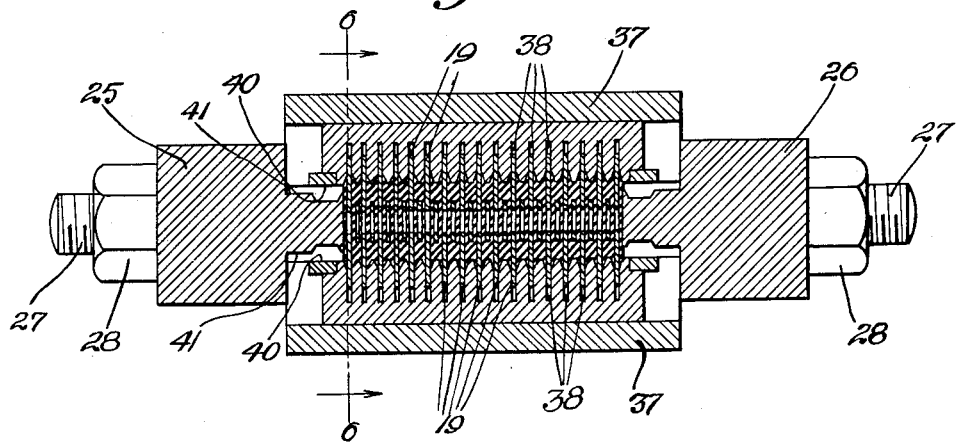
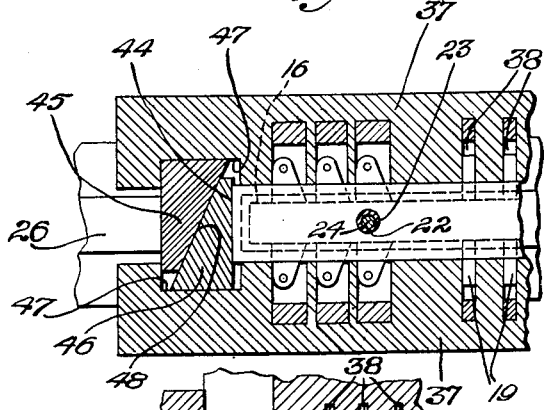
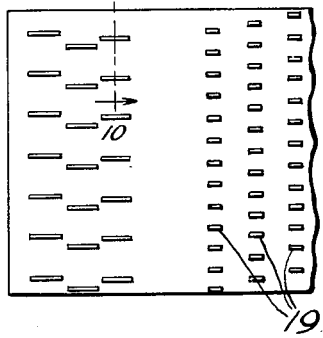
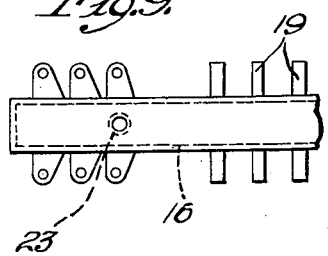
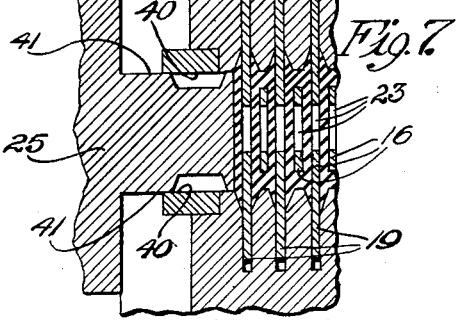

1,595,107

UNITED STATES PATENT OFFICE.

JOHN J. LYNG, OF YONKERS, NEW YORK, AND LLOYD E. WOOD, OF CHICAGO, ILLINOIS, ASSIGNORS TO WESTERN ELECTRIC COMPANY, INCORPORATED, OF NEW YORK, N. Y., A CORPORATION OF NEW YORK.

COMPOSITE ARTICLE AND METHOD OF MAKING THE SAME.

Application filed June 12, 1924. Serial No. 719,645.

This invention relates to composite articles and methods of making composite articles.

An object of the invention is to construct a composite article in which the elements constituting it are united in an integral structure solely by the adhesive substance associated with the elements thereof.

Another object of the invention is to construct a composite article by superimposing alternately electrical conducting strips and strips of a phenol plastic composition and curing the assembled strips into a unified structure.

Another object of the invention is to firmly interlock layers of fibrous strip material of a structure comprising superimposed electrical conducting strips and strips of fibrous material in alternate relation.

A further object of the invention is to seal from moisture and atmosphere the electrical conducting strips of a structure of this type with the exception of the projecting portions forming the contacts and terminals by means of insulating material.

A still further object of the invention is to provide a composite laminated structure having smooth outer faces.

And a still further object of the invention is to provide a structure of this type wherein the superimposed strips are uniformly spaced.

The present invention may be employed to advantage for making terminal banks of large size involving a large number of terminals, forming a part of an automatic selector switch of a type used in telephone exchange systems, but it is to be understood that it is not limited to this purpose, but only in so far as is defined by the appended claims.

Terminal banks of this character often include as many as three hundred rows of multiple contacts and are at present manufactured in sections of this size. A number of these sections may be combined to form a larger terminal bank. One method which has been used in manufacturing banks of this sort is to superimpose or pile up one on the other alternate strips of considerable length of electrical conducting material and paper impregnated with an insulating and bonding material. Projections on the metal strips form the contacts and the whole pile when assembled forms a bank with individual contacts projecting on either side. An arrangement of this sort is shown in a patent to Dixon, No. 1,127,741, February 9, 1915.

In producing composite articles in accordance with one embodiment of the invention, a plurality of strips of fibrous material, such as paper or fabric, which have been previously cut from sheets individually impregnated with a phenolic varnish, which may consist of phenol and formaldehyde, the varnish then having been dried and partially condensed or cured into a synthetic resin may be superimposed with a plurality of electrical conducting strips in alternate relation upon an assembling fixture. The superimposed structure may then be placed in a compressing mechanism and compressed to size during the application of heat whereby all the conducting strips are uniformly spaced and the longitudinal edges of the impregnated strips are compressed to completely condense or cure the resin and transform the impregnated strips into a homogeneous, infusible, insoluble and very rigid structure.

In accordance with a second embodiment of the invention, a plurality of strips of insulating material, which have been previously cut from sheets of semi-cured phenol-plastic composition may be superimposed with a plurality of electrical conducting strips in alternate relation upon an assembling fixture. The superimposed structure may then be placed in a compressing mechanism and compressed to size during the application of heat whereby the strips of phenol-plastic are cured together into a solid homogeneous structure.

Various features of the invention not specifically mentioned will clearly appear from the following description and the accompanying drawings in which, Referring to the drawings:

Fig. 1 is a side view of a fixture for assembling the electrical conducting and the insulating strips of a terminal bank in a superimposed relation;

Fig. 2 is an end view thereof;

Fig. 3 is a cross sectional view of the mechanism for compressing the superimposed strips in a direction parallel to their edges;

Fig. 4 is a vertical sectional view taken on the line 4—4 of Fig. 3 looking in the direction indicated by the arrows;

Fig. 5 is a cross sectional view of the mechanism for compressing the superimposed strips of fiber laterally;

Fig. 6 is a vertical sectional view taken on the line 6—6 of Fig. 5 looking in the direction indicated by the arrows showing the means for compressing the superimposed strips of fiber longitudinally;

Fig. 7 is an enlarged fragmentary view of Fig. 5 illustrating the mechanism at the end of its compressive movement and the superimposed layers forming the terminal bank compressed into their finished state;

Fig. 8 is a fragmentary side view of a terminal bank produced according to the process;

Fig. 9 is a top plan view thereof, and

Fig. 10 is an enlarged fragmentary vertical sectional view taken on the line 10—10 of Fig. 8 looking in the direction indicated by the arrows.

One method illustrated by the drawings may be carried out by first providing a number of strips indicated by the numeral 15 of paper, cloth or other suitable material that has been impregnated with a varnish preferably composed of phenol and formaldehyde which is dried and thus becomes partially cured or condensed into a synthetic resin and cut to a suitable size and a number of electrical conducting strips indicated by the numeral 16 also cut to a suitable size. As clearly indicated in Figs. 3 and 4 the paper strips 15 are wider and longer than the conducting strips 16 which allows the strips 15 during the practice of the process, to be compressed to the size indicated by the broken outline 17, the broken line 18 indicating the outline of the conductor strips 16 which in the completed terminal bank are entirely sealed from the atmosphere with the exception of projecting contacts 19, 19 by the wall of compressed strips of impregnated paper.

The strips 15 and 16 are assembled in super-imposed relation upon a fixture 20 comprising a base 21 having vertically disposed removable aligning tubes 22 formed of treated material similar to the strips 15 mounted thereon. During the manufacture of the strips 15 and 16 which are preferably punched from sheets by a punch press, openings 23 are formed therein which in the assembly of the strips upon the fixture 20 align with the tubes 22.

Upon the assembly of the desired number of the strips 15 and 16 upon the fixtures 20, they are transferred therefrom upon metal pins 24 inserted through the tubes 22 and suitably aligned between compressing members 25 and 26 (see Figs. 3 and 5) by entering the ends of the pins 24 into suitable openings provided therein. The openings 23 through the superposed strips 15 and 16 are also used in the mounting of the bank upon a metal supporting frame (not shown) by bolts or rods (not shown) passing therethrough, the bolts or rods being of the same diameter as the pins 24. The tubes 22 in the completed bank provide a wall of insulating material between the strips 16 and the bolts or rods used to secure the bank upon the frame. The members 25 and 26 are connected together at either end outside of the ends of the superimposed strips by screw threaded bolts 27 passing therethrough and provided with nuts 28 at either end. Mounted on either side of the assembled strips see Figs. 3 and 4 are plates 30 provided with slots 31 which extend clear across the plate and into which the projecting contacts 19, 19 of the conducting strips 16 enter. The nuts 28 are now screwed upon the bolts 27 until the required overall dimension is reached which is reached when the inside faces 33 of the members 25 and 26 engage the faces 34 of the plates 30 as clearly indicated in Fig. 3. To provide for a uniform spacing of the strips heat is applied at right angles to the line of compression by the members 25 and 26 and during such compression by suitably heating the plates 30 before mounting them in position upon the faces of the superimposed strips, or simultaneously with the compression thereof. This provides for the softening of the resin in all of the impregnated strips and therefore each strip 15 is compressed an equal amount thereby uniformly spacing all of the strips 15 and 16.

The next step in the process consists in applying pressure and heat in a lateral direction to the edges of the strips of impregnated paper while still being held under pressure by the members 25 and 26. The pressure of the members 25 and 26 is first released sufficiently to allow the plates 30 to be removed and thereafter die plates 37 are substituted therefor, and thereafter the members 25 and 26 are returned to their former position. The plates are provided with openings 38, 38 which closely fit around the projecting contacts 19, 19 (see Figs. 5, 6 and 7) and thereby provide for the correct spacing and alignment thereof during the final application of heat and pressure. In Figs. 5 and 6 the die plates are shown in position before pressure and heat are applied with the inside of the plates contacting against the edges of the paper strips 15. The assembled terminal bank positioned between the members 25 and 26 and the die plates 37 is then placed in a press of any suitable type having heated platens, wherein it is subjected to heat and pressure sufficient to completely cure or condense the resin and transform the impregnated strips and tubes 22 into a homogeneous, infusible, insoluble and very rigid structure. The position of the die plates 37 after the compression by the press is shown in Fig. 7. The compression movement of the die plates is limited by the inside surface indicated at 40 contacting with the surfaces 41 of the members 25 and 26 as clearly shown in Fig. 7.

During the final application of heat and pressure impregnated tubes 22 are cured simultaneously with the strips 15 to form homogeneous walls of insulation for the openings 23 in the conductor strips 16. (See Fig. 10.)

In the last described step the paper strips 15 are compressed until the excess width thereof is compressed into the interstices 42, 42 formed between the strips 15 and 16. (See Figs. 1, 2 and 3.) This seals the conductor strips from atmosphere, firmly interlocks the paper strips, one to the other, and provides the faces of the terminal banks with a very smooth finish, thereby improving the appearance thereof over similar structures of the prior art.

The ends of the terminal bank indicated by the numeral 44 are compressed for the same reason as the faces thereof, and simultaneously with the compression thereof by blocks 45 and 46, suitably mounted within slots 47 formed in the die plates 37. (See Fig. 6.) The blocks 45 and 46 are provided with cooperating inclined faces 48 which upon the movement of the die plates 37 toward each other during compression cause the block 46 to be moved to the right, thereby compressing the end edges of the paper strips in a longitudinal direction in the same manner as the side edges thereof are compressed in a lateral direction.

The invention may be practiced in accordance with a second method by assembling alternately strips of conducting material and insulating strips previously cut to size from sheets of phenol plastic, and then subjecting the assembled strips to heat and pressure as hereinbefore described in connection with the practice of the first method.

While a specific form of mold or compressing mechanism has been described herein for the purpose of clearly disclosing one manner in which the steps of the methods of carrying forward the invention may be practiced, it is to be understood that the methods might be performed by using apparatus of a different character. The particular type of mold or press disclosed is not claimed herein but will be made the subject of another application to be filed hereafter.

What is claimed is:

1. The method of making composite articles which consists in superimposing sheets containing a synthetic resin and sheets of a different character having projecting lugs, the first mentioned sheets being greater in extent than the latter sheets but less in extent than the projecting lugs thereof, and subjecting the superimposed sheets to the action of heat and pressure applied to the sides and edges thereof to produce a smooth homogeneous external surface of an infusible and insoluble character.

2. The method of making composite articles which consists in superimposing strips containing a partially cured phenol condensation product and strips of a different character having projecting lugs, the first mentioned strips being greater in width and length than the latter strips but narrower than the projecting lugs thereof, and subjecting the superimposed strips to the action of heat and pressure applied to the sides and edges thereof to cure the condensation product and to produce a smooth homogeneous exterior surface of an infusible and insoluble character.

3. The method of making composite articles which consists in superimposing metal strips having projecting lugs and separating strips of paper containing a partially cured phenol condensation product, the strips of paper being greater in width and length than the metal strips but narrower than the projecting lugs thereof and subjecting the superimposed strips to the action of heat and pressure applied to the sides and edges thereof to cure the condensation product and to produce a smooth homogeneous exterior surface of an infusible and insoluble character.

4. The method of making composite articles which consists in superimposing compressible strips containing a synthetic resin with reatively noncompressible strips, the compressible strips being greater in area than the said non-compressible strips and subjecting the superimposed strips to the action of heat and pressure applied to the sides and edges thereof to uniformly space the non-compressible strips and interlock the compressible strips.

5. The method of making terminal banks which consists in superimposing electrical conducting strips having projecting lugs and separating strips of paper containing a partially cured phenol condensation product, the strips of paper being greater in width and length than the electrical conducting strips but narrower than the projecting lugs thereof, and subjecting the superimposed strips to the action of heat and pressure applied to the sides and edges thereof to cure the condensation product and produce a smooth homogeneous exterior surface of an infusible and insoluble character.

6. The method of making terminal banks consisting in superimposing electrical conducting strips having projecting lugs and separating strips of paper containing a phenol condensation product, the strips of paper being greater in width and length than the electrical conducting strips but narrower than the projecting lugs thereof, and subjecting the superimposed strips to the action of heat and pressure applied to the sides and edges thereof to uniformly space the electrical conducting strips and form the paper superimposed strips into a homogeneous structure.

7. The method of making terminal banks consisting in superimposing electrical conducting strips having projecting lugs and separating strips of paper containing a partially cured phenol condensation product, the strips of paper being greater in width and length than the electrical conducting strips, but narrower than the projecting lugs thereof, and then subjecting the superimposed strips of paper to the action of heat and pressure applied to the sides and edges thereof, to uniformly space the electrical conducting strips, cure the condensation product and to render it infusible and to provide the terminal bank with smooth homogeneous outer faces.

8. The method of making terminal banks consisting in superimposing electrical conducting strips having projecting lugs, and separating strips of paper containing a partially cured phenol condensation product, the strips of paper being greater in width and length than the electrical conducting strips, but narrower than the projecting lugs thereof, and then subjecting the superimposed strips of paper to the action of heat and pressure applied to the sides and edges thereof to uniformly space the electrical conducting strips, interlock the strips of paper, cure the condensation product and to render it infusible.

9. The method of making terminal banks consisting of superimposing electrical conducting strips having projecting lugs and separating strips of paper containing a partially cured phenol condensation product, the strips of paper being greater in width and length than the electrical conducting strips but narrower than the projecting lugs thereof, and then subjecting the superimposed strips of paper to the action of heat and pressure applied to the sides and edges thereof to uniformly space the electrical conducting strips, interlock the strips of paper, provide the terminal bank with smooth outer faces, cure the condensation product and to render it infusible.

10. A terminal bank for telephone exchange systems formed from alternately superimposed strips of metal having projecting contacting lugs and separating strips of fibrous material containing a partially cured phenol condensation product, the separating strips being of greater area than the metal strips but narrower than the projecting lugs thereof, and the whole superimposed structure having been subjected to pressure and heat along the sides and edges thereof to uniformly space the metal strips, bind the superimposed strips together and provide the terminal bank with smooth outer faces.

11. A composite article formed from alternately superimposed strips of one character having projecting lugs and separating strips of another character containing a partially cured phenol condensation product, the separating strips being of greater area than the first strips but narrower than the projecting lugs thereof and the whole superimposed structure having been subjected to pressure and heat along the sides and edges thereof whereby the first strips are uniformly spaced and the superimposed strips are bound together to provide the superimposed structure with smooth outer faces.

In witness whereof, we hereunto subscribe our names this 29 day of May, A. D. 1924. and this 5th day of June, A. D. 1924.

JOHN J. LYNG.
LLOYD E. WOOD.